United States Patent [19]
Lamy

[11] 3,710,889
[45] Jan. 16, 1973

[54] ATTENUATION OF NOISE FROM AIR OR GAS INTAKE DUCTS, MORE ESPECIALLY IN AIRCRAFT JET TURBINE ENGINES

[75] Inventor: Jacques Edouard Lamy, Fontenay-aux-Roses, France

[73] Assignee: Societe Nationale D'Etude et De Construction De Moteurs D'Aviation, Paris, France

[22] Filed: April 20, 1970

[21] Appl. No.: 30,119

[30] Foreign Application Priority Data

April 23, 1969 France..............................6912896

[52] U.S. Cl..............181/33 HA, 137/15.1, 415/119
[51] Int. Cl................................................F02k 11/00
[58] Field of Search .181/33 HA, 33 HB, 35 R, 35 A, 181/56; 137/15.1, 15.2; 415/119, 181

[56] References Cited

UNITED STATES PATENTS

| | | | |
|---|---|---|---|
| 3,583,417 | 6/1971 | Clark | 137/15.1 |
| 3,080,707 | 3/1963 | Vetter | 137/15.1 |
| 2,772,620 | 12/1956 | Ferri | 137/15.1 |
| 2,882,881 | 4/1959 | Nedley | 181/35 X |
| 3,532,129 | 10/1970 | Ward et al. | 137/15.1 X |

FOREIGN PATENTS OR APPLICATIONS

| | | | |
|---|---|---|---|
| 921,127 | 3/1963 | Great Britain | 415/119 |
| 935,119 | 8/1963 | Great Britain | 415/119 |

*Primary Examiner*—Richard B. Wilkinson
*Assistant Examiner*—John F. Gonzales
*Attorney*—William J. Daniel

[57] ABSTRACT

A device for the attenuation of noise emanating from the intake duct of a machine fed with gaseous fluid, comprising a structure for location in the duct which is adapted to split the intake into a multiplicity of elementary flows and to subject each flow to a sonic-speed restriction, together with means for reconstituting the intake immediately downstream of said structure.

9 Claims, 5 Drawing Figures

PATENTED JAN 16 1973 3,710,889
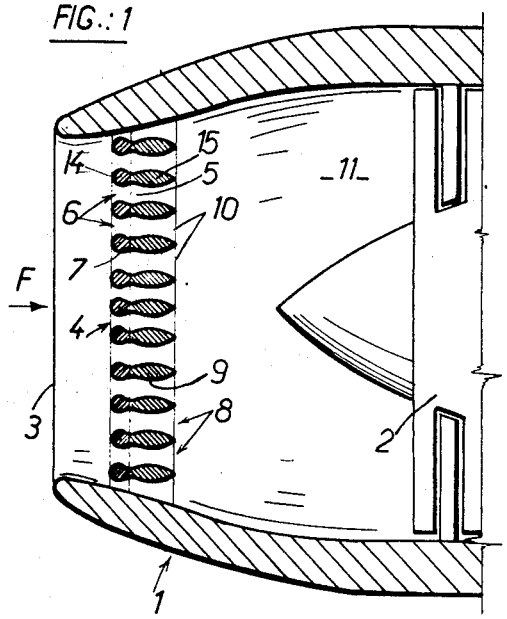
FIG.:1
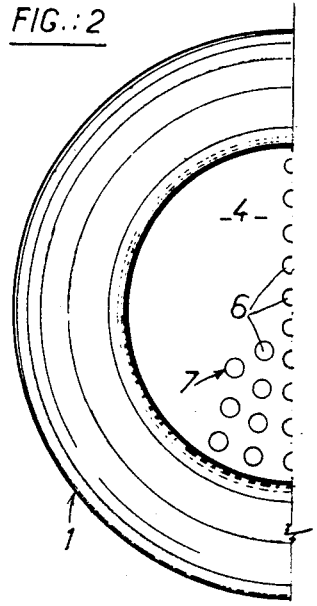
FIG.:2
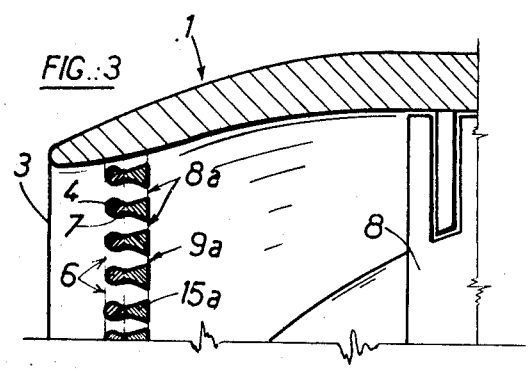
FIG.:3
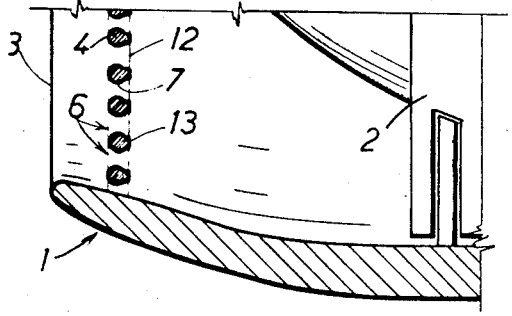
FIG.:4
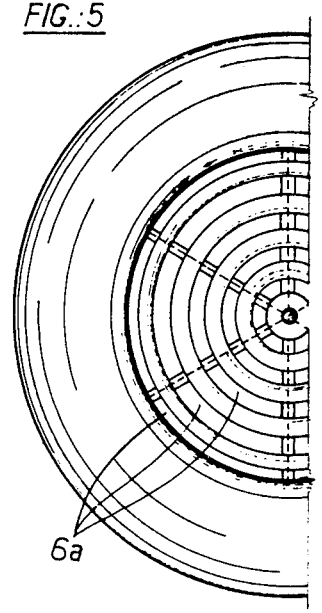
FIG.:5

ATTENUATION OF NOISE FROM AIR OR GAS INTAKE DUCTS, MORE ESPECIALLY IN AIRCRAFT JET TURBINE ENGINES

This invention relates generally to the attenuation of noise which spreads towards the upstream end of air or gas intake ducts in an enclosed space or in an engine, and more especially but not exclusively to the attenuation of noise emitted by the compressors or blower means of aircraft jet turbine engines.

In a jet turbine engine, the fluid involved creates noise through its own movement, and the engine itself can be the source of internal noise. Normally these types of noise spread towards the exterior through the intake orifice, and it is most desirable to attenuate them, more especially in the case of a jet engine in an aircraft flying close to the ground.

With this aim in view, the proposal has already been made to position a device inside the intake duct, preferably a device which may be retracted during flight, which forms a sonic-speed restrictive throat or which comprises a plurality of openings each forming a sonic-speed throat. Already known devices, however, bring about a considerable loss of efficiency in the combination of the intake duct and the engine, as well as disturbances in the operation of the latter.

It is well known that a sonic or supersonic flow does not, by its nature, allow the forward travel of sound-associated disturbances (or even disturbances of the Hugoniot type, that is to say, not necessarily just small disturbances). Experience demonstrates that if a sonic-speed restrictive throat is created, that is, a reduction in pressure brought about by a decrease in the surface-area allowing the throughput of fluid at the intake, virtual elimination is achieved of the internal noise which tends to travel forward along the jet of fluid through the intake.

The "a priori" difficulty in the practical adaptation of this physical phenomenon derives from the fact that the jet of fluid is very greatly disturbed downstream of the sonic throat if the latter is not followed by evolutions, of conventional type as regards the material concerned, of the surface involved in the throughput, the models relating to such evolutions being provided by supersonic wind-tunnels. In one embodiment of an air intake sound-proofed by this method, in order to obtain a correct intake flow into the engine, for example a turbine engine, a theoretical solution would be to provide two successive sonic throats. It may be thought that, if a considerable loss of pressure is acceptable, the second throat could be dispensed with, it being possible to arrange a certain amount of recompression through shock effects with a greater or less exercise of ingenuity. It is evident that the problems posed are delicate ones if the gas flow is to be of adequate quality at the engine intake. This is particularly the case if it be desired to approach the question of compressor blading without fixed vanes at the intake.

Investigations carried out by the Applicant have made it possible to demonstrate a point which was not "a priori" evident, that by treating on an extremely small scale the problem concerning the decompression and then the recompression of the flow, the said difficulties could be eliminated.

With this end in view, the device according to the invention comprises a multiplicity of juxtaposed elementary sonic throats and means facilitating, very slightly downstream of these throats, both the recompression and the intermingling of the elementary flows traversing the throats, this being effected so as to achieve, downstream of a large number of small good-quality passages, a subsonic flow which is practically homogeneous and regular, and which comes up to the usual intake flow into the engine.

Preferably each elementary sonic throat is formed of a convergent-divergent unit immediately followed by a convergent-divergent unit for recompression, the latter forming a second sonic throat. The discharge orifices appertaining to the divergent units for recompression are advantageously juxtaposed in such a way as not to create eddies between the elementary flows, which are at first separate and which link up at the exit of the said divergent units. The divergent units for recompression may, however, be abbreviated. The device may also undergo abbreviation ahead of the second series of sonic throats, that is, ahead of the location for the reconstitution of the subsonic flow. The abbreviation arrangement brings about, downstream of the first sonic throats, a succession of shock effects which ensure a certain degree of recompression, then a homogenization of the flow accompanied by frictional action and a mixing effect, this being at the cost of a greater loss of pressure.

It is advisable to note that, in the device according to the invention, the recompression and mixing or joining-up of the multiple elementary flows occur immediately downstream of the sonic throat or of its divergent portion, this giving rise to a practically homogeneous subsonic flow further downstream. On the other hand, in already known arrangements which include a plurality of sonic throats, the precaution was taken of making the discharge orifices of the divergent portions of the said throats contiguous, without any abbreviation; by this means, downstream the juxtaposition of supersonic flows was achieved, something which brought about the disadvantageous effects mentioned hereinbefore.

It is advisable to note also that, for an intake of a given cross-section, the length of the passages is all the smaller, the larger the number of the said passages. If, therefore, an increase in the number of passages brings about an increase in the cross-section of the solid surfaces in contact with the fluid, the decrease in the length of the passages largely compensates for the increase in occurrences of friction which give rise to losses arising from the said friction. On the other hand, with the passages being short, a homogeneous subsonic jet is reconstituted again very rapidly downstream of the noise-reducing device.

The following description referring to the accompanying drawing, which is given by way of non-limitative preferred example, will also bring out the various features of the invention and the practice thereof.

In the drawing:

FIG. 1 is a view in a diagrammatic section taken through the air intake duct of a jet turbine engine which includes a device according to the invention, FIG. 2 is a bisected view from in front, looking in the direction of the arrow F in FIG. 1, FIGS. 3 and 4 are views similar to FIG. 1 demonstrating other embodiments of the device according to the invention, and FIG. 5 is a view similar to FIG. 2, showing a modification.

FIG. 1 shows the forward part of an aircraft jet engine comprising an air intake duct 1 and a compressor 2. In the said duct 1 and in the vicinity of the intake orifice there is attached, by any suitable means, a structure 4 which includes a multiplicity of elementary nozzle-like ducts 5 having dual restrictive throats. In the example shown here, the said structure has been brought into being by the placing together of two contiguous perforated plates 14 and 15; the perforations 6 in the plate 14 are so configured as to form the elementary convergent-divergent units which constitute the first sonic throat 7 of each nozzle-like duct 5. The perforations 8 in the plate 15 each form, in succession behind each of the first-named throats respectively, a convergent-divergent unit for recompression which constitutes the second sonic throat 9.

As will be seen in FIG. 2, the passages 5 have a circular cross-section and are distributed so as to be located at the junction of a network so that they will form a mesh-like pattern.

The air entering the duct 1 through the orifice 3 at a subsonic velocity divides into a multiplicity of elementary flows which pass into the perforations 6, 8. They expand within the perforations 6 and reach sonic velocity in the restrictive throats 7, and then supersonic velocity in the divergent portions of these perforations 6, so producing the noise-reducing effect that is sought after. They then undergo recompression immediately inside the perforations 8, resuming sonic velocity at the restrictive throats 9, and subsequently subsonic velocity in the divergent portions of these perforations 8.

Juxtaposed discharge orifices 10 appertaining to the perforations 8 thus emit a multiplicity of subsonic elementary flows at a uniform pressure, these flows proceeding parallel to each other and undergoing interpenetration, without either shocks or eddies, in the downstream portion 11 of the intake duct 1, so as to form a homogeneous resulting flow. A proper linking-up of the elementary flows at subsonic speeds will be obtained by juxtaposing and linking together in a closely associated manner the discharge orifices 10. The resulting flow reaches the compressor 2 practically in the condition which it would be in if there were no noise-reducing device, there being incurred merely the loss of pressure brought about by friction effects, which are minimal, as was explained hereinbefore, and by the dividing and linking together of the elementary flows which occur at a subsonic speed. The compressor 2 is therefore able, without any major inconvenience, to accept the elimination of fixed vanes at the intake, as is indicated here.

FIG. 3 shows an embodiment in which the plate 15 is replaced by a thinner plate 15a, so that the perforations 8a to effect recompression are abbreviated virtually level with the sonic throats 9a. In this embodiment, the recompression of the elementary flows initiated in the convergent passages formed in the perforations 8a takes place immediately downstream of the latter by reason of the small eddies which occur because of the abbreviation. It will be appreciated that in this embodiment the thus abbreviated perforations 8a form in the plate 15a a multiplicity of convergent passages each terminating at its downstream end in a sonic-speed discharge orifice for the stream emerging from the corresponding perforation 6.

The situation is similar in the embodiment shown in FIG. 4, in which the plate 15 has been completely omitted, so that the elementary flows emerge at a supersonic velocity level with the outlets 12 of the perforations 6. At the location where they emerge shockwaves occur, these being attached to the parts 13 of the plate which surround the said outlets 12, so that the elementary flows undergo recompression immediately and mix.

The drawings show the structure 4 in the operative position, in which it is exerting a noise-reducing effect. This effect is only sought after during the take-off and landing of an aircraft, and during normal flight it is possible to eliminate the losses which result from this effect by replacing the plates by perforated structures which are able to retract in flight. Numerous structures are known which can retract up against or into the walls of a duct and which place themselves in an active position transversely inside the said duct; for this reason, it does not seem necessary to describe them in detail.

It will be readily apparent to the people skilled in the art that the multiplicity of sonic throats can be carried into effect by means of slots instead of perforations. For example, FIG. 5 shows a modification in which the passages forming the sonic throats are provided in the form of a multiplicity of circular or annular slots 6a arranged concentrically around the axis of the intake duct.

I claim:

1. In and for an intake duct of a machine fed with gaseous fluid, a device for attenuating the noise which spreads towards and emerges from the upstream end of the duct, said device comprising:

a structure disposed in said duct incorporating a multiplicity of passages, each having an initial convergent region in which the cross-sectional area of the passage decreases to form a sonic-speed throat followed by a divergent region in which the cross-sectional area of the passage re-expands, whereby an intake of gaseous fluid entering the duct at subsonic speed is subdivided by said structure into a corresponding multiplicity of streams which accelerate to sonic speed in said convergent region and then expand downstream thereof in said divergent region, and means adjacent the outlet of each said passage for effecting recompression of the stream emerging therefrom to change the downstream flow into a subsonic flow.

2. A device according to claim 1 wherein the passages are in the form of a multiplicity of annular slots.

3. A device according to claim 1 wherein said structure has a downstream face extending generally transversely to the duct axis and said downstream face includes a multiplicity of solid surface regions surrounding the outlet of each of the passages therein to produce shock waves in the streams emerging from such outlets and thereby effect recompression of such streams.

4. In and for an intake duct of a machine fed with gaseous fluid, a device for attenuating the noise which spreads towards and emerges from the upstream end of the duct, said device comprising:

a structure disposed in said duct incorporating a multiplicity of passages, each having an initial convergent region in which the cross-sectional area of the passage decreases to form a sonic-speed throat followed by a divergent region in which the cross-sectional area of the passage re-expands, whereby an intake of gaseous fluid entering the duct at subsonic speed is subdivided into a corresponding multiplicity of streams which accelerate to sonic speed in said convergent region and then expand downstream thereof in said divergent region, and a multiplicity of additional throat-like passages each having in succession a convergent and a divergent region, each such passage being located immediately downstream of the outlet of the corresponding first passage to receive the stream emerging therefrom to form a further sonic-speed throat in said further passage.

5. A device according to claim 4 wherein the structure comprises two closely joined plates in which are respectively arranged the first convergent-divergent passages and the further convergent-divergent passages.

6. A device according to claim 4 wherein the passages are so arranged that the downstream termination of the divergent regions are contiguous.

7. In and for an intake duct of a machine fed with gaseous fluid, a device for attenuating the noise which spreads towards and emerges from the upstream end of the duct, said device comprising:

a structure disposed in said duct incorporating a multiplicity of passages, each having an initial convergent region in which the cross-sectional area of the passage decreases to form a sonic-speed throat followed by a divergent region in which the cross-sectional area of the passage re-expands, whereby an intake of gaseous fluid entering the duct at subsonic speed is subdivided into a corresponding multiplicity of streams which accelerate to sonic speed in said convergent region and then expand downstream thereof in said divergent region, and a multiplicity of convergent passages each located immediately downstream of the corresponding convergent-divergent passage to receive the stream emerging therefrom and terminating at its downstream end in a sonic-speed discharge orifice for the stream.

8. A device according to claim 7 wherein the structure comprises two closely joined plates in which are respectively arranged the convergent-divergent passages and the convergent passages.

9. In and for an intake duct of a machine fed with gaseous fluid, a device for attenuating the noise which spreads towards and emerges from the upstream end of the duct, said device comprising:

a structure disposed in said duct incorporating a multiplicity of passages, each having an initial convergent region in which the cross-sectional area of the passage decreases to form a sonic-speed throat followed by a divergent region in which the cross-sectional area of the passage reexpands, whereby an intake of gaseous fluid entering the duct at subsonic speed is subdivided by said structure into a corresponding multiplicity of streams which accelerate to sonic speed in said convergent region and then expand downstream thereof in said divergent region, and means adjacent the outlet of each said passage for effecting recompression of the stream emerging therefrom to change the downstream flow into a subsonic flow, wherein the passages form a multiplicity of perforations through a generally solid plate, said perforations being distributed regularly to form a mesh-like pattern.

* * * * *